United States Patent [19]

Brenner et al.

[11] B 4,009,773
[45] Mar. 1, 1977

[54] PAPER ROLL HANDLING APPARATUS

[75] Inventors: Lawrence A. Brenner, Brookfield, Wis.; Charles H. Scholl, Vermilion, Ohio

[73] Assignee: Beloit Corporation, Beloit, Wis.

[22] Filed: Mar. 20, 1974

[21] Appl. No.: 452,944

[44] Published under the second Trial Voluntary Protest Program on March 30, 1976 as document No. B 452,944.

[52] U.S. Cl. .............................. 198/344; 214/1 BC; 214/151

[51] Int. Cl.² ......................................... B65G 29/00

[58] Field of Search .............. 214/1 BC, 1 BH, 151, 214/DIG. 4; 198/20 R, 25, 210; 242/79, 58.6; 104/35, 46, 48

[56] References Cited

UNITED STATES PATENTS

| | | | |
|---|---|---|---|
| 1,615,115 | 1/1927 | Durhan, Jr. | 214/DIG. 4 |
| 1,736,016 | 11/1929 | Rosener | 214/DIG. 4 |
| 2,431,320 | 11/1947 | Fischer | 198/210 X |
| 3,142,486 | 7/1964 | Viescas | 198/210 X |
| 3,195,444 | 7/1965 | McLean | 214/1 BC X |
| 3,329,369 | 7/1967 | Guthrie | 242/58.6 |
| 3,384,048 | 5/1968 | Kutcher | 198/210 X |
| 3,659,729 | 5/1972 | Lamkemeyer | 198/210 X |

*Primary Examiner*—Frank E. Werner
*Attorney, Agent, or Firm*—Hill, Gross, Simpson, Van Santen, Steadman, Chiara & Simpson

[57] ABSTRACT

Paper roll handling apparatus comprising an elevated member supported for rotation about a vertical axis and having a plurality of roll suspending devices in angularly spaced relation about the axis and selectively operable to engage and suspend rolls to be carried by the member and for releasing the rolls, the member being driven step-by-step to advance the suspending devices successively into positions related to a plurality of angularly spaced stations. The elevated member may be in the form of a ring-shaped carriage having a rim riding on supporting rollers. Spoke-like beams supported by the carriage ring and by a hub mounted rotatably on a center post support the roll suspending devices each of which has reciprocably operable probe mandrels for engaging in the cores of rolls to be suspended. Means are provided for selectively rotating the rolls through one of the mandrels of each of the suspending devices. Indexing means accurately align the suspending devices with the successive spaced stations.

24 Claims, 11 Drawing Figures

PAPER ROLL HANDLING APPARATUS

This invention relates to apparatus for handling paper rolls, and is more particularly concerned with safely transporting rolls of pressure-sensitive paper successively to spaced stations where the rolls can be efficiently processed such as wrapped for shipment from a paper making plant.

Rolls of pressure-sensitive record sheet paper of the kind having a coating on at least one surface thereof provided with minute, multiple-droplet-retaining pressure-rupturable capsule units for supplying marking liquid are difficult to handle by mechanical equipment without damage to at least outer layers of the pressure-sensitive paper, in contrast to ordinary rolls of paper which are relatively unaffected by uneven, casual, concentrated loading and handling pressure encountered along the circumference of the rolls during handling. A particular problem is encountered in handling rolls of pressure-sensitive paper before and during the various steps related to wrapping the rolls for shipment and storage. That is, after the rolls have been wound and the wound paper secured against unintentional unwinding, the rolls must be protectively wrapped for shipment from the paper making plant to the users. Rolls of ordinary paper do not present any special problem in handling involving engagement with the perimeter of the roll by handling apparatus. U.S. Pat. No. 3,342,014 may be referred to as an example of a roll wrapper excellent for rolls of ordinary paper but involving numerous contacts with the perimeter of the rolls by parts of the wrapper apparatus which would detrimentally affect pressure sensitive paper. However for production line product flow it is necessary to provide proper orientation of the rolls of pressure sensitive paper relative to wrapping apparatus.

It is, accordingly, an important object of the present invention to overcome the foregoing and other shortcomings and problems involved with prior paper roll handling apparatus and to attain important advantages and improvements and new results in particular as related to the handling of rolls of pressure-sensitive paper.

Another object of the invention is to provide new and improved apparatus for handling paper rolls in a suspended manner through various operating stations.

A further object of the invention is to provide new and improved apparatus for handling paper rolls in a manner to avoid handling apparatus contact with the perimeter of the rolls for transportation from station to station in a step-by-step production line.

Still another object of the invention is to provide new and improved means for picking up paper rolls, presenting the rolls to successive operating stations and then discharging the rolls in a step-by-step manner.

A still further object of the invention is to provide a new and improved method of and means for handling rolls of pressure-sensitive paper including transportation of the rolls and intermittent operating rotation of the rolls at a plurality of stations while maintaining the roll perimeters free from possible damaging contact with handling apparatus.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which:

Figure 1:
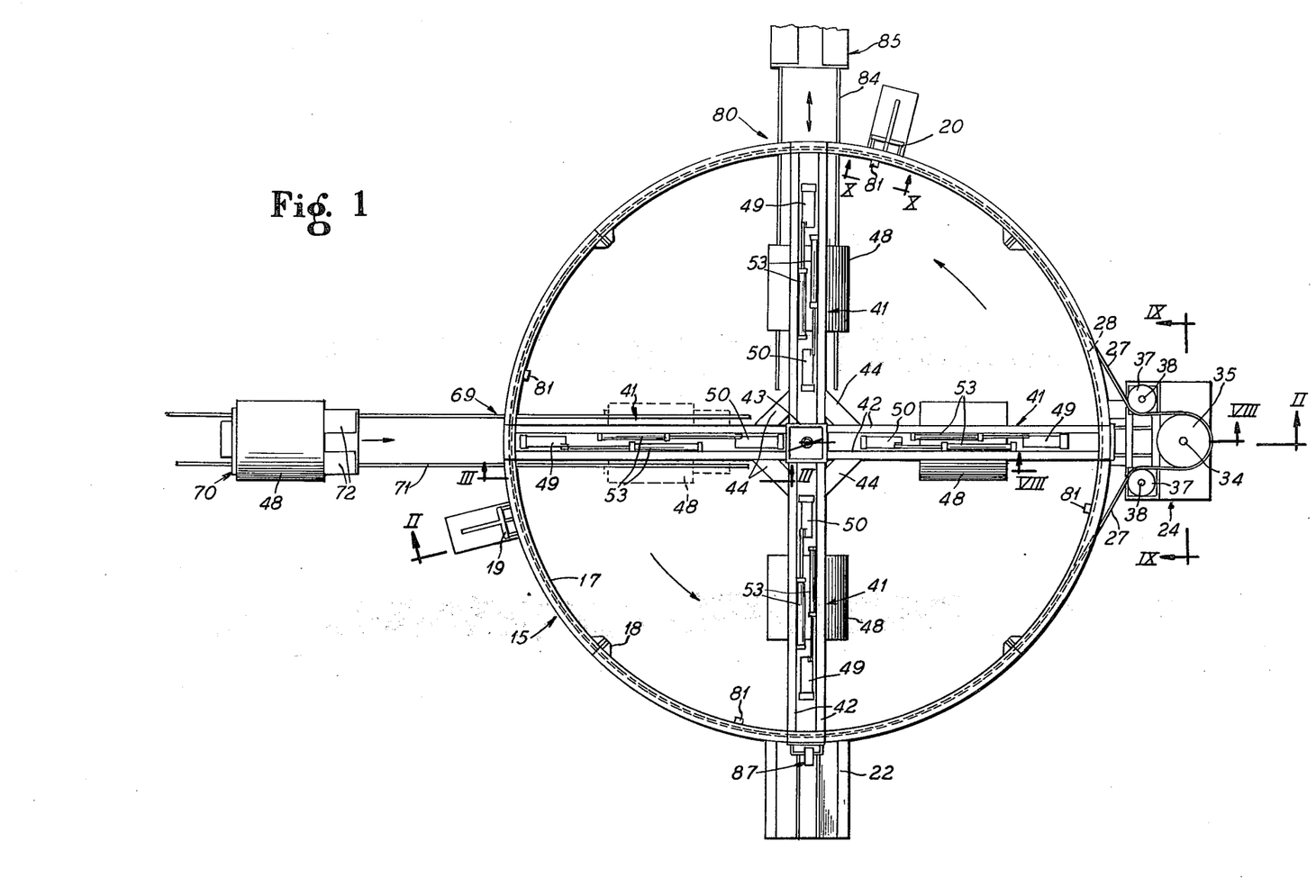
FIG. 1 is a top plan view of apparatus embodying features of the invention.
Figure 2:
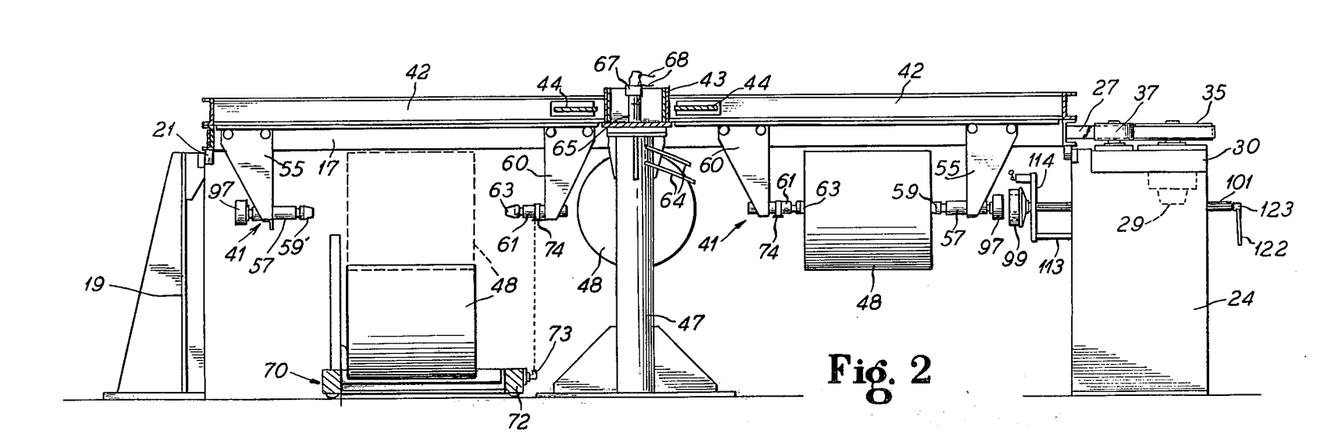
FIG. 2 is a sectional elevational detail view taken substantially along the line II—II of FIG. 1.
Figures 7, 8:
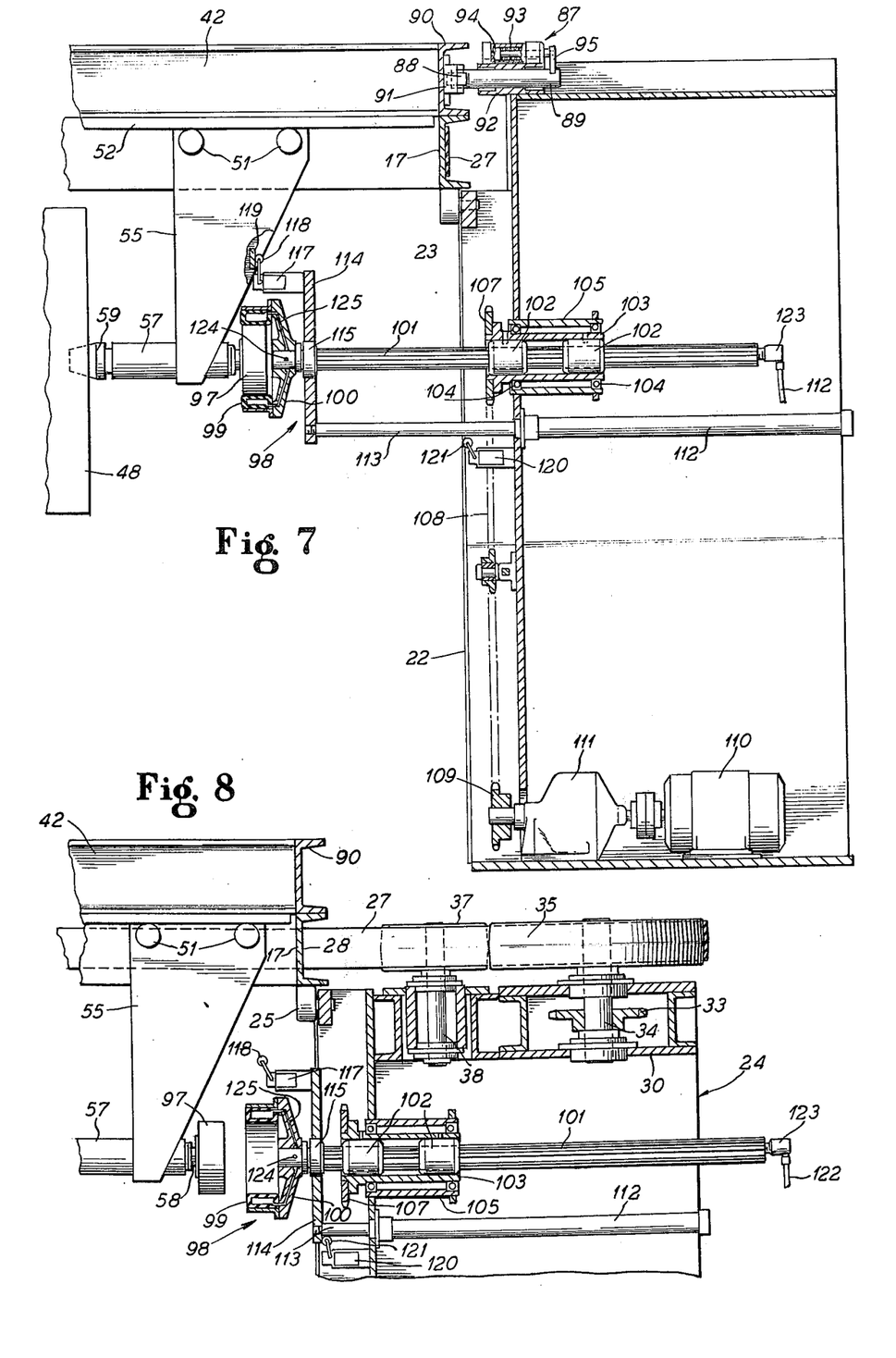
FIG. 7 is an enlarged fragmentary vertical sectional elevational view taken substantially along the line VII—VII of FIG. 4.
FIG. 8 is an enlarged fragmentary vertical sectional view taken substantially along the line VIII—VIII of FIG. 1.
Figure 10:
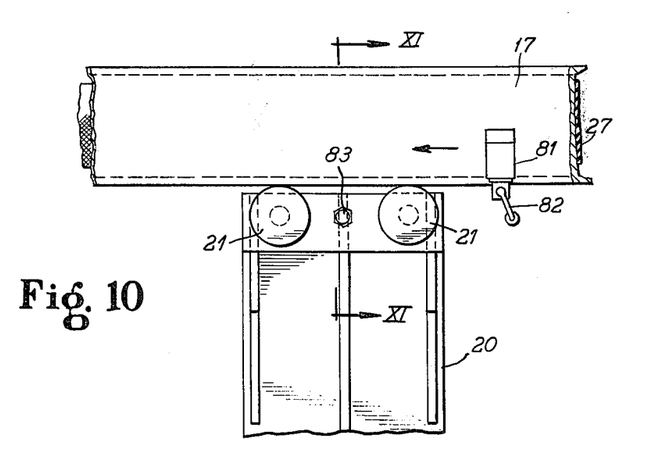
FIG. 10 is a fragmentary enlarged vertical elevational view taken substantially in the plane of line X—X of FIG. 1.

Apparatus according to the present invention, as depicted in FIG. 1, comprises an elevated carriage 15 desirably in the form of a downwardly facing ring 17 of suitable diameter and of pulley form and which for convenience may be constructed of complementary segments suitably secured into end-to-end ring form as at securing flanges 18 at the joints. Means for supporting the carriage ring 17 at a desired elevation for rotation about a vertical axis comprise suitable stands which are located at properly circumferentially spaced intervals and comprising a pair of stands 19 and 20 located at generally opposite sides of the ring and each provided with upwardly facing supporting rollers 21 (FIGS. 2 and 10). In addition, a first operating station stand 22 has carriage rings supporting rollers 23 (FIG. 7) and a second operating station stand 24 has ring supporting rollers 25 (FIG. 8).

Figures 9, 11:
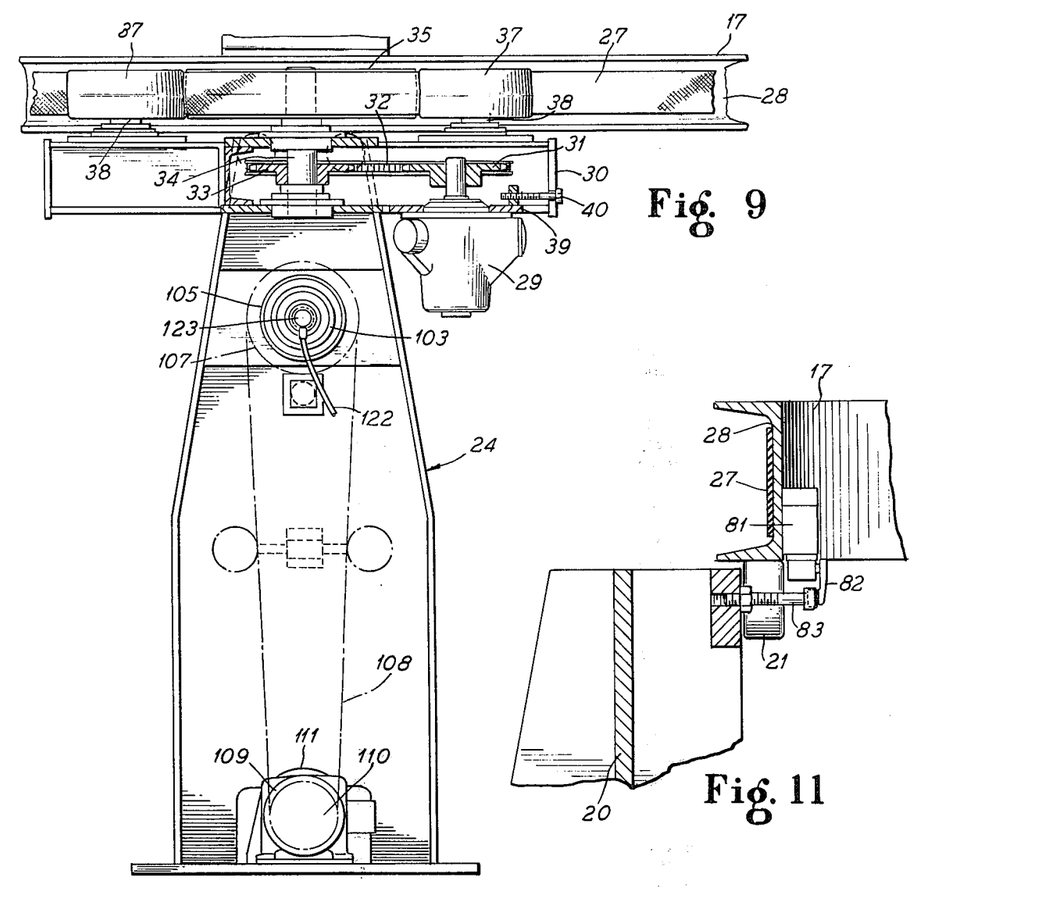
FIG. 9 is an enlarged fragmentary vertical sectional elevational view taken substantially along the line IX—IX of FIG. 1.
FIG. 11 is a vertical sectional detail view taken substantially along the line XI—XI of FIG. 11.

Rotation of the ring, in this instance in a counterclockwise direction as indicated by directional arrows in FIG. 1, is effected by means comprising an endless drive belt 27 engaging in an outwardly opening channel groove 28 in the carriage ring. Driving of the belt 27 is effected by means of a low speed high torque hydraulic motor 29 (FIG. 2 and 9) and mounted on a support 30 on the upper end portion of the stand 24. Transmission of power from the motor 29 is suitably effected by means of a motor driven sprocket 31 acting through a sprocket chain 32 to drive a sprocket 33 keyed to a vertically extending rotary stub shaft 34 mounted on the stand 24 and carrying a drive pulley 35 (FIGS. 1, 8 and 9) about which the belt 27 is trained and maintained in at least 180° pulley-perimeter engagement with both the drive pulley 35 and the pulley perimeter of the carriage ring 17 by a pair of complementary pull-in idler pulleys 37 mounted rotatably on respective vertical stub shafts 38 carried by the support 30 at a suitable position in alignment along a line between the pulley 35 and the perimeter of the ring 17. Thereby maximum driving torque is gained from the power input to the driving pulley 35 with nevertheless safety slippage permitted in the event of malfunction of any sort affecting the driving means or the carriage ring 17. Convenient mounting of the motor 29 is on a mounting plate 39 (FIG. 9) with the motor depending from the support 30. For tensioning the sprocket chain 32, the motor mount 39 is adjustably mounted and take-up means comprisiing a screw 40 are connected between the support 30 and the mount 39.

A plurality of roll-suspending devices 41 (FIG. 1) is carried by the carriage 15. In the present instance, the apparatus is equipped with four of the devices 41 quadrantly spaced within the ring 17 about its vertical axis to accomodate a four station system. Each of the devices 41 has supporting means comprising a spoke-like rugged dual track and supporting arm structure including a pair of spaced parallel back-to-back channel bars 42. At their radially outer ends, the arm bars 42 are fixed to the upper sides of the carriage ring 17. At their radially inner ends, the arm bars 42 are fixed to a common hub mount 43. Rigid braces 44 are fixed between the sides of the inner ends of the arm bars 42. Rotary support for the central hub mount 43 is provided by a thrust bearing assembly 45 (FIGS. 2 and 3) on the upper end of a center supporting post 47.

Figure 3:
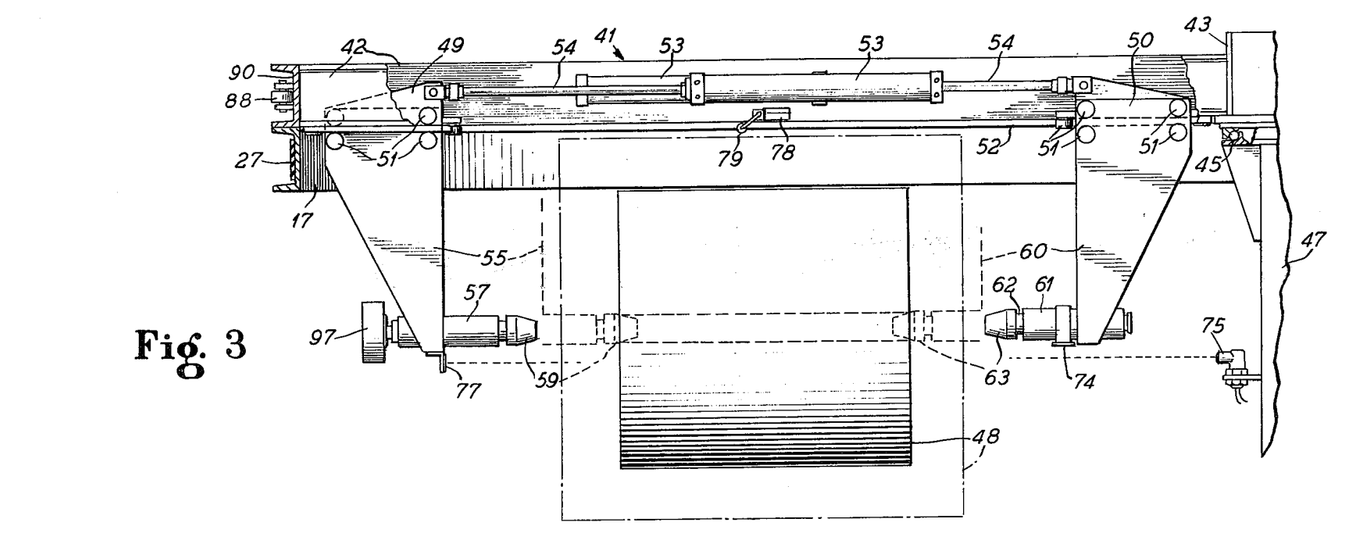
FIG. 3 is an enlarged fragmentary sectional elevational view taken substantially along the line III—III of FIG. 1.

Each of the devices 41 is equipped to engage with and support rolls 48 of paper of various diameters and lengths, two different sizes of which are illustrated in FIG. 3, by way of example. To this end, each of the devices 41 comprises a pair of spaced complementary trolleys 49 and 50 mounted to run reciprocably in the space between the supporting bars 42 on antifriction rollers 51 riding respect rail flanges 52 extending longitudinally along and fixed to the lower sides of the bars 42. In this instance the trolley 49 is located adjacent to the outer end of the supporting arm provided by the bars 42 and the trolley 50 adjacent to the inner end of the arm. Means for driving the trolleys 49 and 50 reciprocably in unison comprise fluid operated actuators in the form of respective rectilinear hydraulic cylinders 53 mounted on the respective inner sides of the bars 42 and having respective piston rods 54 connected to the associated trolleys. Through this arrangement, by operation of the actuators 53 the trolleys 49 and 50 are adapted to be moved in unison toward and away from one another along the tracks 52.

Figures 4, 5, 6:
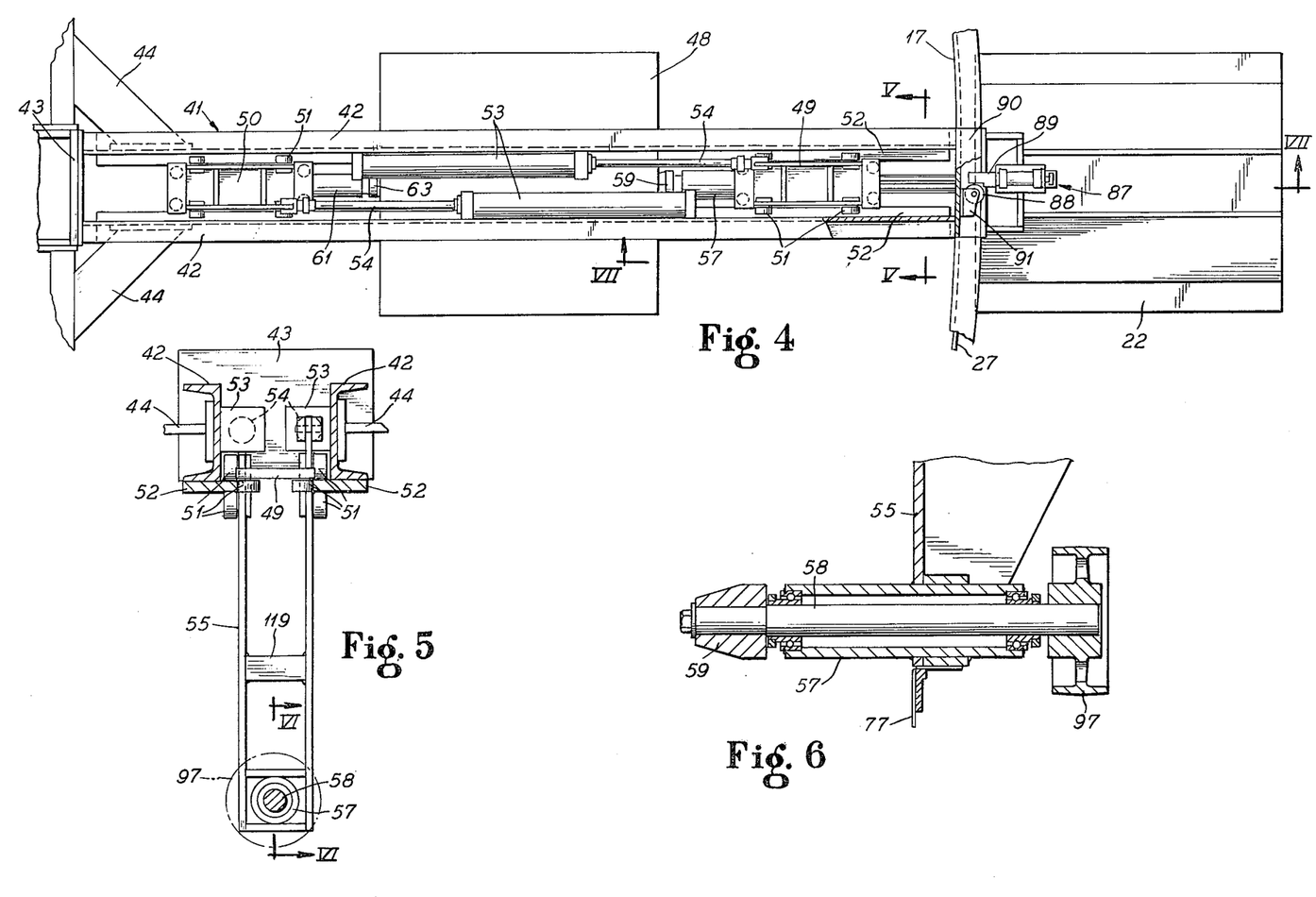
FIG. 4 is a fragmentary plan view of the apparatus showing indexing means for the carriage.
FIG. 5 is a fragmentary vertical sectional elevational view taken substantially along the line V—V of FIG. 4.
FIG. 6 is an enlarged fragmentary sectional view taken substantially along the line VI—VI of FIG. 5.

Means are provided on the trolleys 49 and 50 for releasably engaging and suspending on a horizontal axis below the supporting beam arm bars 42 the roll 48 which is to be carried by the device 41. To this end, the trolley 49 has a rigid depending suspension frame 55 (FIGS. 5 and 6) carrying rigidly on its lower end a horizontally extending tubular shaft support 57 rotatably journaling an axle shaft 58 carrying on its inner end portion a tapered probe mandrel 59 dimensioned to engage in a center core of the roll to be supported by the device. Similarly, the carriage 50 has a depending rigid supporting frame 60 (FIGS. 2 and 3) carrying fixedly on its lower end portion a tubular shaft support 61 coaxial with the shaft support 57 and rotatably supporting an axle shaft 62 carrying a roll core engaging tapered probe mandrel 63. The mandrels 59 and 63 are adapted to be moved in unison into and out of the center core of the roll 48 to be supported by reciprocation of the trolleys 49 and 50 as motivated by the actuators 53.

Suitable operating and control means are provided for the actuators 53, including a hydraulic system having supply/return lines 64 (FIG. 2) communicating through a head pipe 65 on top of the center post 47 and a rotary coupling 67 on the pipe with the respective actuators 53 by way of ducts 68 leading from the coupling.

Means providing a roll loading station 69 are provided 90° clockwise from the stand 22 as viewed in FIG. 1. For this purpose, a cart 70 carries the rolls 48 one at a time along a track 71 extending along the floor on which the apparatus is mounted radially toward the center post 47 under the carriage ring 17 and with the carriage supporting stand 19 efficiently located in adjacent spaced relation at the off running side of the track having regard to the direction of rotation of the carriage. Suitable means, not shown, are provided for supplying the paper roll 48 to the cart 70 at a position outside of the carriage 17 and depositing the roll on a horizontal axis safely on a cradle 72 of the cart. The cart 70 is then driven by suitably means (not shown) in the direction of the arrow in FIG. 1 along the track 71 into position under and inside the carriage 17 with the roll 48 aligned for delivery to the device 41 aligned over the track 71. Proper longitudinal orientation of the cart 70 under the device 41 with the ends of the roll 48 substantially centered between the mandrels 59 and 63 is assured by sensing means such as an electric eye 73 mounted on the front end portion of the cradle 72 and aimed upwardly to receive energizing beam reflected from a downwardly facing reflector 74 (FIGS. 2 and 3) carried by the shaft support 61 on the inner trolley 50. A signal may be conveyed by the electric eye 73 to operating means for the cart 70 to actuate the cart for raising the roll 48 into position between the mandrels 59 and 63 wherein the roll cores are aligned with the mandrels. Means for automatically controlling the cart 70 to stop elevation of the roll 48 at alignment of the roll cores with the mandrels 59 and 63 comprise an electric eye 75 (FIG. 3) mounted on the center post 47 at an elevation slightly lower than the mandrels 59 and 63 and aimed toward a reflector 77 carried by the lower end of the support frame 55. The eye 75 is energized during ascent of the roll 48 and as the center core hole of the roll aligns with the eye 75 so that the beam between the eye and the reflector 77 is completed, a control signal is delivered as to suitable timing means of the operating means for the cart 70 to bring the roll 48 to a halt with the center cores aligned with the probe mandrels 59 and 63 which are then driven by the actuators 53 into supporting engagement with the roll 48 as indicated in dash outline in FIG. 3, and the cart lowers the cradle 72 to clear the roll and moves back to the starting or roll-receiving position.

If during the roll raising activity of the cart 70, there is a malfunction of the control means including the electric eye 75, or for any other reason the roll is raised above the elevation necessary to register its core hole with the mandrels 59 and 63, overrun safety means in the form of a limit switch 78 will cause the cart 70 to stop its roll elevating action short of contact of the roll perimeter with the undersides of the tracks 52. For this purpose, the limit switch 78 is mounted on the lower portion of one of the bars 42 and has a generally depending actuating lever 79 engagable by the top of the roll perimeter if there is a tendency for such perimeter to intrude the arm bars 42.

After the paper roll 48 has been loaded onto and is supported by the device 41 which at any given time is in registration with the loading station 69, and all other stations about the carriage 17 are free for step-by-step advance of the devices 41 to the next succeeding station, the drive motor 29 is operated to drive the belt 27 for turning the carriage 17 by a 90° increment, thereby advancing the newly loaded roll 48 to the stand 22 representing a first treating station wherein, for example, the roll 48 may be wrapped with protective and enclosing wrapping material derived from a suitable roll wrapping apparatus (not shown). At the same time, the roll 48 which is transported away from the wrapping station is oriented with the stand 24 representing a second treating station such as that in which the wrapping material is crimped and fastened with respect to the roll 48 by suitable apparatus (not shown). Concurrently, the fully wrapped and sealed in roll 48 transported from the crimping station is advanced to an unloading station 80 located immediately beyond the off running side of the stand 20. As the carriage 17 reaches the turn cycle position in which the device supporting arms 42 are aligned with the four stations, automatic control means comprising a limit switch 81 carried by the carriage ring 17 is operated to stop the motor 29 and bring the carriage to a halt for unloading the finished roll 48 at the unloading station 80, for loading another of the rolls 48 at the station 69 and for functioning of the operations at the stations 22 and 24. It will be observed that there are four of the control limit switches 81, one being located adjacent to each trailing side of the associated arm 42. Each of the limit switches 81 may be in the form of a microswitch having a swingable control lever 82 (FIGS. 10 and 11) engagable with a trip stud screw 83 carried by the stand 20 in proper position to trip the limit switch just as the associated arm 42 registers with an unloading cart track 84 extending radially under the carriage 17 diametrically opposite to the stand 22 and supporting an unloading cart 85 which is reciprocably operable as indicated by directional arrow to move into position to receive a finished roll from the aligned device 41 and to transport the finished roll away from the carriage 15.

Indexing means 87 (FIGS. 1, 4 and 7) are provided on the carriage ring 17 and the stand 22 for assuring accurate registration of the devices 41 with the respective stations about the carriage ring 17. In a desirable construction the indexing means comprises a respective indexing stop 88 carried by the ring 17 in alignment with each of the devices 41 engagable with a retractable stop pin 89 carried by the stand 22. Each of the arm assemblies 42 has on its outer, ring end and overlying the ring 17 a mounting bracket 90 which carries the stop 88 in the form of a stop roller supported by a clevis bracket member 91 fixedly secured to the bracket 90. Support for the indexing pin 89 is provided by a tubular guide bearing 92 fixedly mounted on the top of the stand 22 and within which the pin is reciprocably movable between a normal stopping position wherein it projects into the path of the nearest stop 88, and a retracted position to which it is adapted to be moved in opposition to a biasing spring 93 in a pneumatic actuator 94 connected to the outer end of the pin 89 as by means of a key plate 95. Through this arrangement, when the carriage 15 is to be advanced rotatably, the actuator 94 is activated to release the indexing pin 39 from its latching position relative to the stop 88, and after the carriage is in motion, the indexing pin 89 is released to return to its latching position so that when the next succeeding stop 88 arrives at the station identified with the stand 22, the carriage will be brought positively to a stop with all of the devices 41 in accurate registration with the respective stations.

Means are provided for turning the supported rolls 48 about their axes at the stations identified with the stands 22 and 24. For this purpose, each of the spindle shafts 58 carries corotatively on its outer end a drum 97 (FIGS. 1, 3, 6, 7 and 8) which is engagable by releasable rotary driving means of preferably identical construction carried by each of the stands 22 and 24. Each of the rotary driving means 98 comprises a doughnut shaped high coefficient of friction inflatable clutch 99 carried rotatably by a head 100 mounted on the inner end of an elongated spline shaft 101 carried by spaced spline bearings 102 mounted fixedly in a sleeve 103 rotatable on bearings 104 in a tubular support 105 fixedly secured to the associated stand. For driving the spline shaft 101 rotatably, means are provided comprising a sprocket 107 secured to the sleeve 103 and driven through a sprocket chain 108 by means of a drive sprocket 109 coupled to the drive shaft of a motor 110 through reduction gearing in a housing 111. For shifting the driving clutch 99 reciprocably between a clutching, roll driving position as shown in FIG. 7, and a retracted free position as shown in FIG. 8, means are provided comprising a two-way air cylinder 112 fixedly mounted on the associated stand and having projecting therefrom a piston rod 113 attached to a bracket 114 carried by the clutch end portion of the shaft 101 on a bearing 115. In the clutching engagement of the clutch 99 with the drum 97, the actuator 112 is stopped through signal from a limit switch 117 carried by the bracket 114 and having a control lever which in the fully extended clutching position of the shaft 101 engages a stop surface 119 on the supporting frame 55, as best seen in FIG. 7. Return stroke of the actuator 112 is terminated when signal means comprising a limit microswitch 120 is actuated through its control lever 121 moved by engagement with the returning bracket 114 as best seen in FIG. 8. In its clutching position, the inflatable clutch 99 is inflated to effect firm clutching engagement with the drum 97 by air pressure supplied by a suitable source through a line 122 connected by means of a rotary coupling 123 to the opposite end of the shaft 101 which for this purpose is hollow to provide a passage communicating at its inner end portion through one or more ports 124 with one or more communicating passages 125 providing air connection between the port 124 and the hollow interior of the inflatable clutch 99. Through this arrangement, positive rotary driving and stopping of the affected roll 48 is accomplished smoothly, efficiently, rapidly, and with substantial precision.

In a practical example of apparatus according to the present invention, a capacity is contemplated for handling rolls of pressure-sensitive, sometimes referred to as carbonless, paper within a range of about 20 inches to 42 inches in diameter and about 6½ inches to 52 inches in length, with a flow-through of about 1 minute per step in the carriage cycles. That is, in each complete rotational cycle of the carriage 15, four rolls 48 are handled by the apparatus.

It will be understood, of course, that operating control of the apparatus will be effected through suitable hydro-electrical and pneumatic and electrical circuitry including adequate valves, switches, control circuits, etc. as desired for controlling the sequence of operations described, both for automatic cycling and manual control at any desired point in the cycle. The several photoelectric and mechanical switch sensors alluded to in the foregoing description are integrated with the overall operating and control circuitry, electrical, hydraulic and pneumatic for the apparatus. Such circuitry may also include features for operation and control of, or at least corelation of, related apparatus such as that for handling the rolls of paper at the loading station, apparatus for unloading the rolls at the unloading station, and any apparatus that may be utilized at the several operating stations between the loading and unloading stations for effecting, for example, wrapping of the rolls and crimping of the wrappers on the rolls.

It will be understood that variations and modifications may be effected without departing from the spirit and scope of the novel concepts of this invention.

We claim as our invention:

1. Apparatus for handling paper rolls provided with center cores, comprising:
   an elevated rotary carriage;
   means supporting said carriage for rotation about a vertical axis;
   a plurality of roll-suspending devices carried by said carriage in angularly spaced relation to one another about said axis;
   each of said devices having means for supporting engagement within opposite ends of the center cores of the paper rolls;
   means for operating said devices for selectively engaging with the roll center cores and suspending the rolls to be carried by said carriage and for releasing the rolls;
   means for driving said carriage rotatably to advance the roll-suspending devices successively into a plurality of station positions which are angularly spaced from one another in the direction of rotation of the carriage; and
   said carriage comprising a downwardly facing ring, and said supporting means comprising a plurality of stands circumferentially spaced about the ring and having upwardly facing roller means supporting the ring.

2. Apparatus according to claim 1 said driving means comprising an endless flexible driving element coupled with said ring, and a power source on one of said stands for driving the flexible element.

3. Apparatus according to claim 2, wherein said power source comprises a low speed high torque motor mounted on said one of said stands.

4. Apparatus according to claim 2, wherein said power source comprises a low speed high torque motor, and power transmission means on said one stand coupling said motor with said driving element.

5. Apparatus according to claim 4, including a stand adjacent to said carriage, and said carriage and said stand having thereon releasably coactive elements of said indexing means.

6. Apparatus according to claim 1, including means for indexing said carriage for alignment of said devices with said stations.

7. Apparatus according to claim 1, including means carried by said carriage for controlling said driving means.

8. Apparatus according to claim 1, including a loading station at one of said positions, means at said loading station for delivering a paper roll to one of the roll-suspending devices aligned with the loading station, and means for sensing proper registration of the loading means with the aligned device.

9. Apparatus for handling paper rolls provided with center cores, the apparatus comprising:
   a rotary carriage comprising a carriage ring of substantial diameter having a plurality of circumferentially spaced radial integral arms joining at a center;
   a center supporting post rotatably mounting said center; a plurality of supporting stands circumferentially spaced from one another along the carriage ring and having roller means supporting the ring rotatably;
   means carried by one of said stands for driving the ring rotatably;
   respective roll-suspending devices carried by said arms and each of said devices having means for supporting engagement within opposite ends of the center cores of the paper rolls; and
   means for operating said devices for selectively engaging with the roll center cores and suspending the rolls under said arms to be carried by said carriage successively into a plurality of station positions which are angularly spaced from one another about the carriage ring in the direction of rotation of the carriage.

10. Apparatus according to claim 9, including means for indexing said carriage step-by-step to assure alignment of the roll-suspending devices of said positions.

11. Apparatus according to claim 9, including means for rotating the rolls in the roll-suspending devices.

12. Apparatus according to claim 9, wherein said devices support the rolls with their core axis radial to said carriage center, and comprising means at one of said positions for loading a paper roll into one of said devices, means at a succeeding position for rotating the roll, and means at a final position for unloading the roll from the device.

13. Apparatus according to claim 9, wherein said devices comprise respective pairs of trolleys supported on radial track beams on said carriage and individual actuators carried by the track beams for actuating the trolleys, and comprising means for operating the actuators in unison and thereby driving said trolleys between unloaded and loaded positions relative to the paper rolls.

14. Apparatus according to claim 9, including means for delivering the paper rolls successively into position under said carriage in alignment with successive ones of said roll-suspending devices, means for transferring the paper rolls from the delivery means to the aligned roll-suspending devices, means for advancing the carriage to carry the suspended rolls successively into a plurality of said station positions, the final one of which is an unloading position, and the roll-suspending devices being operable for transferring the rolls to take away means at the unloading station.

15. Apparatus for handling paper rolls provided with center cores, comprising:
   an elevated rotary carriage;
   means supporting said carriage for rotation about a vertical axis;
   a plurality of roll-suspending devices carried by said carriage in angularly spaced relation to one another about said axis;
   each of said devices having means for supporting engagement within opposite ends of the center cores of the paper rolls;
   means for operating said devices for selectively engaging with the roll center cores and suspending the rolls to be carried by said carriage and for releasing the rolls;

means for driving said carriage rotatably to advance the roll-suspending devices successively into a plurality of station positions which are angularly spaced from one another in the direction of rotation of the carriage;

means carried by said carriage for controlling said driving means;

said means for supporting said carriage including a stand; and means supported on said stand cooperating with said means carried by the carriage for operating said driving means.

16. Apparatus for handling paper rolls provided with center cores, comprising:

an elevated rotary carriage;

means supporting said carriage for rotation about a vertical axis;

a plurality of roll-suspending devices carried by said carriage in angularly spaced relation to one another about said axis;

each of said devices having means for supporting engagement within opposite ends of the center cores of the paper rolls;

means for operating said devices for selectively engaging with the roll center cores and suspending the rolls to be carried by said carriage and for releasing the rolls;

means for driving said carriage rotatably to advance the roll-suspending devices successively into a plurality of station positions which are angularly spaced from one another in the direction of rotation of the carriage; and spoke-like beams on said carriage joined to a center mount corotatable with the carriage, said beams supporting said roll-suspending devices.

17. Apparatus according to claim 16, wherein said beams provide tracks, each of said devices comprise a pair of relatively oppositely reciprocable trolleys running on said tracks and each of which has a roll core engaging mandrel, and said means for operating said devices comprising actuators mounted on said beams and coupled with said trolleys.

18. Apparatus according to claim 17, including means at a roll loading station sensitive to alignment of a roll with the roll suspending devices at such station for controlling operation of said actuators to move the trolleys from a separated unloaded relationship to one another to approach one another and effect roll core engagement of the mandrels with the aligned roll.

19. Apparatus according to claim 17, including means rotatably mounting said mandrels on said trolleys, and means for effecting rotation of one of the mandrels of each device.

20. Apparatus according to claim 19, wherein said means for effecting rotation comprises a drum corotative with said one mandrel, and a selectively operable friction clutch engageable with the drum to effect rotation of the drum to drive the mandrel rotatably.

21. Apparatus according to claim 20, including means mounting said clutch for rotation and also for reciprocation into and out of clutching engagement with the drum.

22. Apparatus according to claim 20, including means for indexing the carriage to assure alignment of said drum with the clutch.

23. Apparatus according to claim 16, including a center supporting post, and means rotatably supporting said center mount on said center post.

24. Apparatus for handling paper rolls provided with center cores, comprising:

an elevated rotary carriage;

means supporting said carriage for rotation about a vertical axis;

a plurality of roll-suspending devices carried by said carriage in angularly spaced relation to one another about said axis;

each of said devices having means for supporting engagement within opposite ends of the center cores of the paper rolls;

means for operating said devices for selectively engaging with the roll center cores and suspending the rolls to be carried by said carriage and for releasing the rolls;

means for driving said carriage rotatably to advance the roll-suspending devices successively into a plurality of station positions which are angularly spaced from one another in the direction of rotation of the carriage;

means for indexing said carriage for alignment of said devices with said stations;

a stand adjacent to said carriage; and said carriage and said stand having thereon releasably coactive elements of said indexing means.

* * * * *